US012192252B2

(12) United States Patent
Christopher et al.

(10) Patent No.: US 12,192,252 B2
(45) Date of Patent: *Jan. 7, 2025

(54) VOICE SERVICE RESTORATION AFTER ELEMENT FAILURE

(71) Applicant: Comcast Cable Communications, LLC, Philadelphia, PA (US)

(72) Inventors: Matthew J. Christopher, Highlands Ranch, CO (US); Raghavendra P. Hegde, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,877

(22) Filed: Oct. 13, 2023

(65) Prior Publication Data

US 2024/0121278 A1    Apr. 11, 2024

Related U.S. Application Data

(63) Continuation of application No. 17/493,369, filed on Oct. 4, 2021, now Pat. No. 11,824,903, which is a continuation of application No. 16/187,741, filed on Nov. 12, 2018, now Pat. No. 11,165,834.

(51) Int. Cl.
*H04L 65/1069* (2022.01)
*H04L 65/1016* (2022.01)
*H04L 65/1104* (2022.01)

(52) U.S. Cl.
CPC ...... *H04L 65/1069* (2013.01); *H04L 65/1016* (2013.01); *H04L 65/1104* (2022.05)

(58) Field of Classification Search
CPC ............ H04L 65/1016; H04L 65/1069; H04L 65/1073; H04L 65/1104
See application file for complete search history.

(56) References Cited

U.S. PATENT DOCUMENTS

| 8,954,786 | B2 | 2/2015 | Mordani et al. |
| 10,326,804 | B1 | 6/2019 | Agarwal |
| 2010/0329206 | A1 | 12/2010 | Thome et al. |
| 2012/0236828 | A1 | 9/2012 | Hapsari et al. |
| 2016/0057801 | A1 | 2/2016 | Xia et al. |
| 2018/0132291 | A1 | 5/2018 | Kalepu et al. |
| 2019/0208393 | A1* | 7/2019 | Bakker ............... H04L 65/1069 |

FOREIGN PATENT DOCUMENTS

| EP | 2515573 A1 | 10/2012 |
| EP | 3866438 A1 | 8/2021 |

* cited by examiner

*Primary Examiner* — Zhensheng Zhang
(74) *Attorney, Agent, or Firm* — Banner & Witcoff, Ltd.

(57) ABSTRACT

A particular computing device providing service to a user device may become unavailable. If a computing device becomes unavailable, a backup computing device may be requested to provide services to user devices on a temporary basis to allow call completion. Messages to the backup computing device instance may indicate the basis for service issues and prompt further action by the computing device, such as registration with an alternative computing device or re-registration with a computing device that was determined to be unavailable.

21 Claims, 9 Drawing Sheets

VOICE SERVICE RESTORATION AFTER ELEMENT FAILURE

CROSS-REFERENCE TO RELATED APPLICATIONS

This application is a continuation of and claims priority to U.S. patent application Ser. No. 17/493,369, filed Oct. 4, 2021, which is a continuation of U.S. patent application Ser. No. 16/187,741, filed on Nov. 12, 2018 (now U.S. Pat. No. 11,165,834), each of which is hereby incorporated by reference in its entirety.

BACKGROUND

An Internet Protocol (IP) Multimedia Subsystem or IP Multimedia Core Network Subsystem (IMS) comprises a framework for delivering IP multimedia services, which may include a combination of voice, video, messaging, data, etc. within a session. A variety of different types of IMS user computing devices (CD) (e.g. user equipment (UE), mobile phones, smartphones, personal digital assistants (PDAs), tablets, and computers) may be used for different types of network based communication and are provided with services by IMS Core Networks.

If a computing device, such as a network server, is unable to provide service for a user computing device, inbound and outbound voice calling capability may be lost. These types of service problems may be due to a network server being down because of a maintenance cycle or because of a software or hardware failure, the computing device having a network issue and thus being unreachable by the user device, or the computing device having lost computing device registration data.

BRIEF SUMMARY

The following summary presents a simplified summary of certain features. The summary is not an extensive overview and is not intended to identify key or critical elements.

Systems, apparatuses, and methods are described for completing incoming calls using an alternative computing device and restoring voice service to the affected user computing device. A network device may complete an incoming call destined to a target user device behind a failed, restarted, or out of service computing device by using a backup computing device. The network device may attempt to transmit an invite (with an INVITE method Session Initiation Protocol (SIP) request line) to the primary computing device with which the user device is registered. Based on a timeout or other response indicating a computing device is unresponsive, a network device may create a new invite for the backup computing device and add a restoration indicator to the SIP request line in the invite going to the backup computing device. These and other features and advantages are described in greater detail below.

BRIEF DESCRIPTION OF THE DRAWINGS

A more complete understanding of features described herein and the advantages thereof may be acquired by referring to the following description in consideration of the accompanying drawings, in which like reference numbers indicate like features, and wherein.

DETAILED DESCRIPTION

Figure 1:
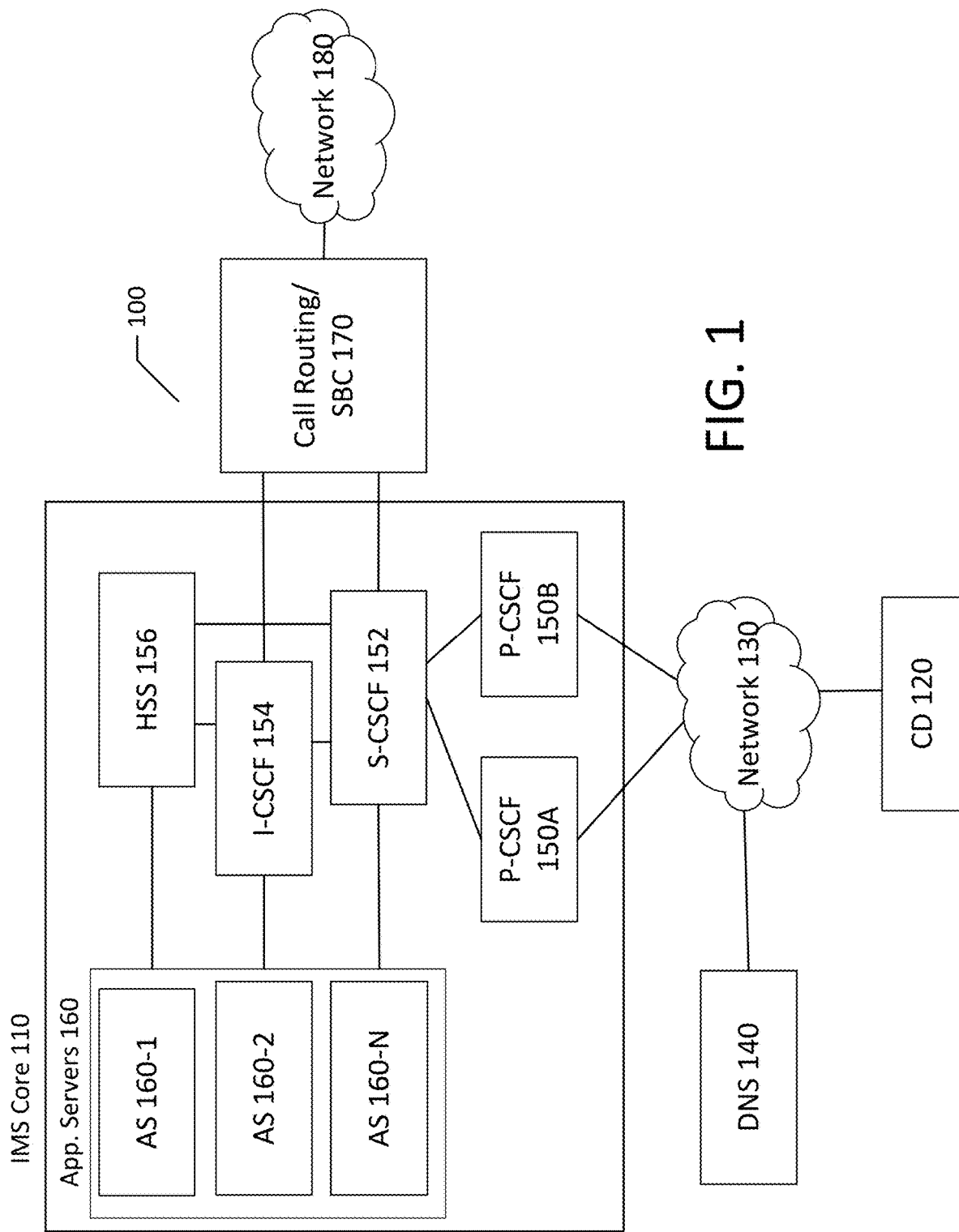
FIG. 1 shows an example system architecture for call routing.

The accompanying drawings, which form a part hereof, show examples of the disclosure. It is to be understood that the examples shown in the drawings and/or discussed herein are non-exclusive and that there are other examples of how the disclosure may be practiced.

Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected", "coupled" and similar terms, is meant to include both direct and indirect connecting and coupling.

If a Proxy Call Session Control Function (P-CSCF) server is unable to provide service for a computing device, inbound and outbound voice calling capability may be lost. In such situations, inbound calls to the computing device may continue to fail until the time the computing device performs a registration process with the network. A Serving Call Session Control Function (S-CSCF) server may complete an incoming call destined to computing device behind a failed, restarted, or out of service P-CSCF server by using a backup P-CSCF server. A backup P-CSCF server may be preconfigured in the S-CSCF server and/or an application server. The backup P-CSCF server may be preconfigured by a system operator.

The S-CSCF server may attempt to transmit an invite (Invite in SIP request line) to the primary P-CSCF server of the computing device. If the P-CSCF server is not reachable, has failed, or is out of service, the invite may timeout. If the P-CSCF server has restarted, the invite may be rejected with a SIP error message. If a P-CSCF server goes through a restart process, the P-CSCF server may lose all the computing device information that it has cached in the resident memory of the P-CSCF server. The computing device and other outside devices, however, may not be aware of the restart process and may continue to behave as if the computing device is registered with a P-CSCF server. Based on timeout or other indicator that a device is unresponsive, the S-CSCF server may create a new invite for the backup P-CSCF server and may add a restoration indicator to the Session Initiation Protocol (SIP) request line in the invite going to the backup P-CSCF server.

A backup P-CSCF server may implement a call flow process to bypass computing device registration checks. Based on an invite with the restoration indicator in its route header, the backup P-CSCF server may complete calls to a user computing device that is not registered with that P-CSCF server. If the backup P-CSCF server determines the presence of a restoration indicator in an SIP invite, the call may be forwarded to the computing device, and a response from the computing device may be forwarded to the S-CSCF server. The S-CSCF server may acknowledge the new communication path to other network elements, such as a session border controller (SBC). Change to the user computing device is not necessary. For service restoration, the S-CSCF server may transmit a SIP notification with restoration indicator and subscription state termination indicator from the S-CSCF server destined to the computing device via a backup P-CSCF server. This notification may be transmitted when the active call ends.

The SIP notify message may include reason codes in the subscription state header. The reason codes may inform the computing device of the P-CSCF server failure type. For example, a restart reason code may indicate that the P-CSCF server has restarted and that the computing device may choose to register with the same P-CSCF server. An out of service reason code may indicate that the P-CSCF server is out of service, unreachable, or has failed. An out of service reason code may indicate that the P-CSCF server, with which the computing device is currently registered, is not currently a viable option and that the computing device may choose to register with a different P-CSCF server. The SIP notify message may also include a restoration indicator in the route header.

The P-CSCF server may be configured to recognize the indicators in the SIP messages. Based on a SIP notify message with restoration indicator in the route header, from the S-CSCF server, the P-CSCF server may bypass the computing device registration checks and may forward the message to the computing device. The P-CSCF server may use conventional SIP routing mechanisms to forward the SIP notify message to the computing device. The P-CSCF server discovery mechanism on the computing device may be configured to recognize the indicators in the SIP messages. The computing device may register with a primary, backup, and/or another functional P-CSCF server based on the information in the reason code of the subscription state header of the SIP notify message. The S-CSCF server may be configured to complete incoming calls using an alternative SIP server or proxy, such as a backup P-CSCF server, and may also restore voice service to the affected user computing device by applying enhancements for call completions and call restorations.

FIG. 1 shows an example of a network architecture and data processing device that may be used to implement one or more features described herein. A home network system 100 may include and IMS Core 110 which may be coupled to a computing device (CD) 120 over an access network 130. The device 120 may comprise any device, such as, for example, a computer (e.g., a laptop, notebook, desktop, or other computer), a wireless device, a mobile device, a handset, an internet of things (IoT) device, a hotspot, a cellular repeater, user equipment and/or, more generally, a computing device. The device 120 may perform the P-CSCF discovery process using the domain name system (DNS) server 140. Although a single device 120 is shown in FIG. 1 for simplicity, multiple devices 120 may interact with each IMS core 110. The access network 130 may comprise one or more devices, e.g., wireless device, base station, eNB, gNB, computing device, etc.

Various network nodes (e.g., one or more elements of the IMS core 110, one or more of the devices 120, one or more of the DNS servers 140, one or more of SBCs 170, one or more elements of the network 180) may be interconnected via a wide area network (WAN), such as the Internet. Other networks may also or alternatively be used, including, without limitation, private intranets, corporate networks, local area networks (LANs), wireless networks, and/or personal networks (PAN). The access network 130 may be replaced with fewer or additional computer networks. A LAN may have one or more of any known LAN topology and may use one or more of a variety of different protocols, such as Ethernet. The various network nodes and other devices may be connected to one or more of the networks via twisted pair wires, coaxial cable, fiber optics, radio waves or other communication media.

The device 120 may identify, through the use of one or more DNS server 140, a particular Call Session Control Function (CSCF) server of the IMS core 110. The IMS core 110 may provide services based on a plurality of standards. As examples, 3GPP, which is a wireless industry base standard, and PacketCable 2.0, which is a Multiple System Operator (MSO) base standard, may be used with the IMS core 110.

The CSCF system may comprise three parts: P-CSCF, S-CSCF, and Interrogating Call State Control Function (I-CSCF)). These three parts may have pre-defined roles and pre-defined interfaces and pre-defined functions. For convenience, portions of this description will refer to a computing device performing P-CSCF operations as a P-CSCF server, to a computing device performing S-CSCF operations as an S-CSCF server, and to a computing device performing I-CSCF operations as an I-CSCF server. Each instance of these IMS parts may comprise one or more of: a physical device, an element, software, program modules, computer functionality, a system module, a user agent, server, data storage devices, and the like. Software features may be implemented in whole or in part in as routines, programs, objects, components, data structures, etc. that perform particular tasks or implement particular abstract data types when executed by a processor in a computer or other device. The functionality may be implemented in whole or in part in firmware or hardware equivalents such as integrated circuits, field programmable gate arrays (FPGA), programmable logic controllers or devices, and the like. Based on an end-user picking up a phone, a number may be dialed and those digits may be injected into a SIP invite message. That invite may be passed across different CSCF elements. The different CSCF elements may perform different, specific functions, but may each be involved in the call path for both call setup and call tear down. If any single CSCF element in the call path were to fail, the call setup may fail, or the call may drop, or other problems may occur.

The device 120 may comprise an embedded digital voice adapter (EDVA), which may be user premises equipment EDVA, which may implement the PacketCable 2.0 protocol. The EDVA may be a voice line card that may be part of a Data Over Cable Service Interface Specification (DOCSIS) cable modem, which may be part of a gateway situated at the user premises. The access network 130 may comprise a wired, optical, hybrid-fiber coaxial and/or other type of network. The access network 130 may comprise a wireless radio access network such as a mobile telecommunication system, such as Evolved Universal Terrestrial Radio Access (E-UTRA), Long-Term Evolution (LTE), LTE-Advanced, 5G, or Global System for Mobile Communications (GSM) networks, a Wi-Fi network or other network according to an IEEE 802.11 standard, or other type of wireless network. The access network 130, which may include a cable modem termination system (CMTS), may be part of a physical data plane and control plane interface.

A plurality of P-CSCF servers may be provisioned in the IMS Core 110. FIG. 1 shows a primary P-CSCF server 150A and a secondary P-CSCF server 150B. As explained in more detail below, the P-CSCF server 150B may perform operations for the device 120 if, e.g., the P-CSCF server 150A is offline. For convenience, the term P-CSCF server 150 will be used herein to describe the particular one of the P-CSCF servers 150A and 150B that is performing operations for the device 120. Each P-CSCF server may be communicatively coupled to the access network 130 and may provide a variety of different network functions, including performing network address translation (NAT) (e.g. between different IP spaces) or firewall functions. The P-CSCF server 150 may be the initial entry point into a service-providers trusted access network, and may be located either in a visited IMS network being accessed from the access network (in full IMS networks) or in the home network (if the visited network is not IMS compliant yet). The P-CSCF server 150 may handle user authentication, may validate the user as authorized, and may handle exchanges of security keys as part of the registration process. Some networks may use a Session Border Controller (SBC) for some or all of these functions. The P-CSCF server 150 may function as a specialized SBC for the user network interface which protects the network and the device 120. The device 120 may discover a P-CSCF server that it should use via a DNS server 140 lookup. The lookup procedure may use Dynamic Host Configuration Protocol (DHCP), the device 120 may be configured (e.g., in connection with initial provisioning and/or via a 3GPP IMS Management Object (MO)) to use one or more specific P-CSCF servers, and/or in a IP Multimedia Services Identity Module (ISIM) and/or assigned in a packet data protocol (PDP) Context (for General Packet Radio Service (GPRS)). The device 120 may send a query to a Dynamic Host Configuration Protocol (DHCP) server to retrieve the IP addresses and/or to obtain a Fully Qualified Domain Name (FQDN) of a P-CSCF server. The device 120 may use the FQDN of a P-CSCF server, obtained using the DHCP procedures, in the DNS 140 look up to retrieve the IP address of the P-CSCF associated with that FQDN.

The IMS core 110 may include a plurality of P-CSCF servers. Although two P-CSCF servers 150A and 150B are shown in FIG. 1, there may be additional P-CSCF servers in the IMS core 110 for load distribution and to provide high availability of services. Each P-CSCF server may be assigned to a device 120 before registration and/or at other times, and need not change for the duration of the registration. The assignment may be based on geography. For example, a user in a western part of a serviced region may register to a west region based P-CSCF server.

The P-CSCF server 150 may be in the path of all signaling for the device 120, and may inspect every signal and message from and to the device 120. The P-CSCF server 150 may provide user authentication and may establish a security association with an IMS terminal or user equipment (e.g., the device 120). The P-CSCF server 150 may be responsible for inspecting signals entering the IMS core 110. For example, the P-CSCF server 150 may inspect packets to ensure that signals from IMS terminals maintain normal signaling routes. The P-CSCF server 150 may include a Policy Decision Function (PDF), which authorizes media plane resources, e.g., quality of service (QoS), over the media plane. The PDF may be used for policy control, bandwidth management, etc. The PDF may also be a separate function. The P-CSCF server 150 may also generate charging records for use in billing.

An S-CSCF server 152 may be the central node of the signaling plane, may be a SIP server, and may perform session control. The S-CSCF server 152 may be implemented as server 103 discussed below with regards to FIG. 9. The S-CSCF server 152 may make some call-routing decisions and may invoke application servers. The S-CSCF server 152 may be located in the home network. The S-CSCF server 152 may use Diameter interfaces to a Home Subscriber Server (HSS) 156 to download user profiles and upload user-to-S-CSCF associations. All necessary user profile information may be loaded from the HSS 156. The S-CSCF server 152 may handle SIP registrations, which allows it to bind the user location (e.g., the IP address of a terminal) and the SIP Address of Record (AOR). The S-CSCF server 152 may be connected to a number of the call routing and interconnection modules 170, which are in turn connected to an outside network 180.

The S-CSCF server 152 may be in the path of all signaling of the locally registered devices, and may inspect every message. The S-CSCF server 152 may decide to which application server(s) 160 a SIP message may be forwarded, in order to provide application services. The S-CSCF server 152 may provide routing services, e.g. using E.164 Number to URI Mapping (ENUM) lookups. The S-CSCF server 152 may enforce the policy of the network operator. Although a single S-CSCF server 152 is shown in FIG. 1 for simplicity, there may be multiple S-CSCF servers 152 in the IMS core 110 for load distribution and to provide high availability of services. The HSS 156 may assign the S-CSCF server 152 to a user, based on the HSS 156 being queried by an I-CSCF server 154. The S-CSCF server 152 also may communicate with other call routing and interconnection elements 170, such as Session Border Controllers, to connect to the outside networks 180, and may provide communication between the devices 120 in the home network 100 and the devices 120 or other devices in the outside networks 180.

The I-CSCF server 154 may perform other SIP functions for the IMS core 110 and may be located at the edge of an administrative domain. The I-CSCF server 154 IP address may be published in the DNS server(s) 140 of the domain (using Name Authority Pointer (NAPTR) and service record (SRV) type of DNS records), so that any remote servers may find it, and use it as a forwarding point (e.g., registering) for SIP packets to this domain. The I-CSCF server 154 may query the HSS 156 to retrieve the address of the S-CSCF 152 server and assign the S-CSCF server 152 address to a user performing SIP registration. The I-CSCF server 154 may also forward SIP requests or responses to the S-CSCF server 152. The I-CSCF server 154 may be implemented as server 103 discussed below with regards to FIG. 9. Although a single I-CSCF server 154 is shown in FIG. 1 for simplicity, there may be multiple I-CSCF servers 154 in the IMS core 110 for load distribution and to provide high availability of services.

The HSS 156 may be a master user database that supports the IMS network entities that actually handle calls. The HSS 156 may contain the IMS subscription-related information (e.g. user profiles), may perform authentication and authorization of users, and may provide information about users' locations and IP information.

The I-CSCF server 154 may be used to hide the internal network from the outside world (encrypting parts of the SIP message), as a Topology Hiding Inter-network Gateway (THIG). That function may also be implemented as part of the Interconnection Border Control Function (IBCF). The IBCF may be used as gateway to external networks, and to provide NAT and firewall functions (e.g. pinholing). The IBCF may be a Session Border Controller specialized for the network-to-network interface (NNI).

The IMS core 110 may also include a plurality of application servers 160. A Telephony Application Server (TAS) may be used by residential IMS users for feature processing, such as call holding, call dialing, or any other feature processing for residential users. A Business Application Server (BAS) may be used to provide services for business users. For example, a law firm may have different office locations and a common home network 100 that are part of one business group, all of which may be served by a single or distributed BAS, which may include applications and/or services customized for the business. Any features, such call forwarding, extension dialing, or any other business features may be served by the Business Application Server. A Communication Application Server (CAS) may be used for other application services, such as a TV call notification service. For example, a home network 100 user who has WiFi and TV services may receive a notification, generated by the CAS, about an identity of a caller may be displayed on a TV.

The servers 140, 150, 152, 154, 156, and 160 may provide overall access, control and administration of databases and control software for performing one or more operations described herein. The servers may be connected to other intermediary servers (not shown) through which users interact with and obtain data as requested. Additionally or alternatively, one or more of the servers may act as a web server and may be directly connected to the Internet. The servers 140, 150, 152, 154, 156, 160 and 162 may be connected to devices 120 via the access network 130, via direct or indirect connection, or via some other network (e.g., the Internet). Users may interact with the servers using a remote computer, a mobile device or other user device 120.

The servers and applications may be combined on the same physical machines, and retain separate virtual or logical addresses, or may reside on separate physical machines. The servers may be configured in the same manner as server 103 discussed in greater detail below with regards to FIG. 9. FIG. 1 shows just one example of a network architecture that may be used. The specific network architecture and data processing devices and/or other devices used may vary. For example, services provided by a Telephony Application Server (TAS) 160 and another application server may be combined.

As a device 120 registers with a particular P-CSCF server 150, a traffic engineer may track, through Key Performance Indicators (KPIs) or reports, a number of devices 120 that are registering to a particular P-CSCF 150 server based on the entries that are indicated in the DNS server(s) 140. As millions of end point devices 120 may be registered with a particular P-CSCF server at any point in time, the volumes generally change gradually. If a P-CSCF server 150 is found to be nearing or in an overloaded state, the traffic engineer may update the DNS server(s) 140 to point at least a portion of a specific geographic region to a different P-CSCF server 150. The devices 120 may begin to register to the different P-CSCF server 150. As such, a portion of the user base of a first P-CSCF server 150 may be directed to a different or second P-CSCF server 150 to avoid an overload condition in the first P-CSCF server 150. The manipulation of DNS entries by an IMS instance or service may allow user equipment or endpoints to be directed to and registered with a new P-CSCF 150.

The IMS core 110 may include a Media Resource Function (MRF), not shown, which may be a media server that provides media related functions such as media manipulation (e.g. voice stream mixing) and playing of tones and announcements. Each MRF may be further divided into a media resource function controller (MRFC) and a media resource function processor (MRFP). The MRFC may be a signaling plane node that interprets information coming from an application server and the S-CSCF server 152 to control the MRFP. The MRFP may be a media plane node used to mix, source or process media streams. The MRFP may also manage access rights to shared resources. The Media Resource Broker (MRB) may be a functional entity that may be responsible for both collection of appropriate published MRF information and supplying of appropriate MRF information to consuming entities such as the AS. The MRB may be used in two modes, a Query mode and an In-Line mode. In the Query mode, an application server may query the MRB for media and sets up the call using the response of MRB, and in the In-Line Mode, an application server may send a SIP INVITE to the MRB and the MRB may set up the call.

The IMS core 110 may include a Call Charging Function (CCF), which may be a server that creates and manages a billing record that may be created as calls are made. The billing record may include information such as a calling party, the called party, the duration of the call, and other information associated with the call needed for billing records. That information may be fed into the CCF by other IMS network elements. The billing records may be concealed from all of other IMS network elements.

The call routing and interconnection modules 170, which may in turn be connected to an outside network 180, may include a variety of session border controllers (SBCs), which serve as edge devices that interface the host network with outside networks. The SBCs may help protect the network from another service provider, providing a firewall and network address translation (NAT) functions as needed, and hiding the network topology so that the IP address space of the home network 100 is not exposed to another service provider. Instead, calls from an outside network to the home network may be sent to the home network SBC IP addresses. A Communications Assistance for Law Enforcement Act (CALEA) SBC may be an interface for legal compliance with law enforcement agencies. Other SBCs for public internet access may be used for over the top (OTT) clients that provide the ability to make and receive calls with a home phone number using a smartphone application. A user specific network-to-network interface (NNI) may be provided for syndicating network service such as home networks voice service to third party networks to which the home network needs to connect. The NNI may act as an SBC to talk with a specific connected outside network and interface to their access network. A peering SBC may provide SIP peering and interconnection to least cost routing carriers, including 911 services. A least cost routing carrier may provide call-terminating services for long distance calls not serviced by direct connections. Priority registration may be provided to preferred or required users, such as for compliance with legal or contractual requirements.

The call routing and interconnection modules 170 may also include a SIP Route Proxy (SRP) that may perform normalization and may perform some routing lookup functions and a Border Gateway Control Function (BGCF) that may make call routing decisions. For example, if a call is destined to an outside network user, a BGCF may send the call to the outside network specific session border controller (SBC). A Media Gateway Control Function (MGCF) and Signaling Transfer Point (STP) may provide IP interworking functions. A media gateway (MGW) may be provided as a translation device or service that converts media streams between disparate telecommunications technologies such as plain old telephone service (POTS), SS7, Next Generation Networks (2G, 2.5G, 3G, 4G, and 5G radio access networks), or private branch exchange (PBX) systems. The MGW may enable multimedia communications across packet networks using transport protocols such as Asynchronous Transfer Mode (ATM) and Internet Protocol (IP). A MGW may provide time-division multiplexing (TDM) to IP interworking for carrier networks that cannot be reached via an IP interconnect. Regulatory requirements or network requirements may require interconnects to outside voice service providers through legacy technology. The MGW may provide access to and interconnection with the public switched telephone network (PSTN) or even a POTS.

Figure 2:
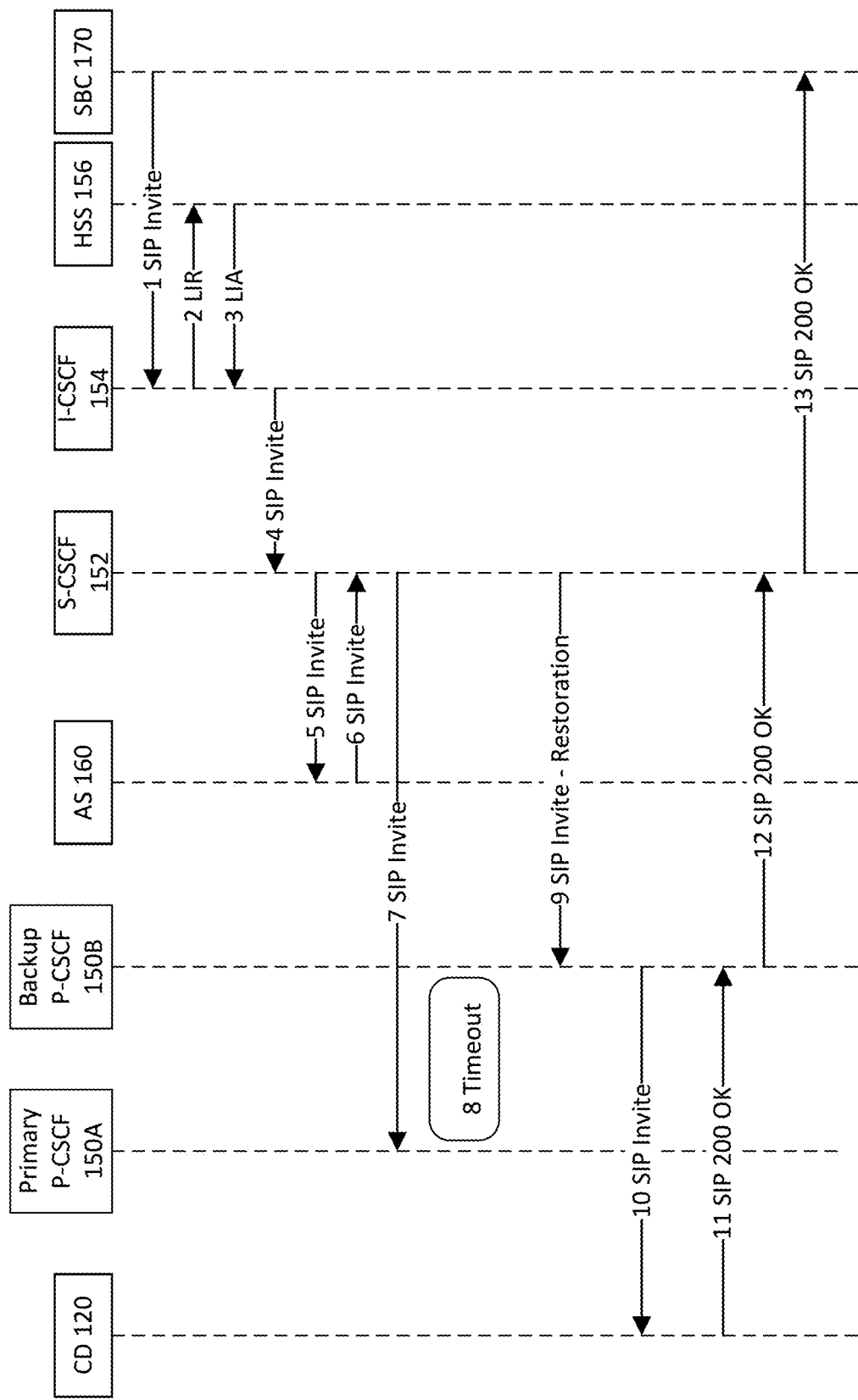
FIG. 2 shows example message flows for using a backup Proxy Call Session Control Function (P-CSCF) server shown in FIG. 1.

An S-CSCF server may complete an incoming call destined to a device 120, despite a failed/restarted/out-of-service (OOS) or an otherwise non-functional P-CSCF server, using a backup P-CSCF server. This call flow may bypass the device 120 registration checks. For example, the backup P-CSCF server may send a call invite message to the device 120 without confirming that the device 120 is registered with the backup P-CSCF server. FIG. 2 is a system messaging diagram showing example message flows for using a backup P-CSCF server 150B, shown in FIG. 1, if a primary P-CSCF server 150A is not available. If an incoming call from a device 120 outside the system to an IMS system 100 is received, an SBC 170 may transmit a SIP Invite, in step 1, to the I-CSCF server 154. The I-CSCF 154 server may query the HSS 156, in step 2, to retrieve the name of the S-CSCF server 152 associated with the dialed user. The I-CSCF server 154 may send a Diameter Location-Info-Request (LIR) to query the HSS 156. In step 3, the HSS 156 may respond to the I-CSCF server 154 query with an identifier of the S-CSCF server 152. The HSS 156 may send a Diameter Location-Info-Answer (LIA) message to respond to the I-CSCF server 154.

The I-CSCF server 154 may transmit, in step 4, the SIP Invite to the S-CSCF server 152. The S-CSCF server 152 may transmit, in step 55, the SIP Invite to the appropriate application server 160, such as a telephone application server (TAS) which may serve phone calls. In step 6, the application server 160 may transmit the SIP Invite to the S-CSCF server 152. The S-CSCF 152 may transmit, in step 7, the SIP Invite to the primary P-CSCF 150A with which the device 120 is registered. If the primary P-CSCF server 150A is not reachable, has failed, or is determined to be out of service, in step 8, the Invite may result in timeout. The timeout may be determined by a device sending the invite message or may be sent by the receiving device based on an inability to process the request. Additionally or alternatively, if the primary P-CSCF server 150A has restarted, does not recognize the SIP Invite, or is not yet able to respond, the Invite may be rejected with an appropriate SIP error response. Without more, at this point the call may fail.

The S-CSCF server 152 may complete an incoming call destined to a device 120 behind a failed, restarted, or out of service (OOS) primary P-CSCF server 150A by utilizing a backup P-CSCF server 150B. If the S-CSCF server 152 does not receive a response to the SIP INVITE from the non-functional or non-responsive P-CSCF 150A server, the S-CSCF server 152 may send a special SIP INVITE to the backup P-CSCF server 150B. If the S-CSCF server 152 receives a SIP error response from the primary P-CSCF server 150A because it was restarted, the S-CSCF server 152 may send a special INVITE to the primary P-CSCF server 150A. The S-CSCF server 152 may transmit, in step 9, the SIP Invite to the back-up P-CSCF server 150B. The backup P-CSCF server 150B may not have registration information for the call target device, so the backup P-CSCF server 150B may respond to a regular SIP INVITE with an appropriate SIP error response. As such, a backup P-CSCF server 150B may need additional information, indicating that the S-CSCF server 152 is restoring service to the call targeted device 120, in order for the call to proceed via the backup P-CSCF server 150B.

As part of sending SIP Invite to the backup P-CSCF server 150B, additional information may be added to the SIP Invite either as a separate SIP header or to an existing SIP header such as Route header. If a SIP message with restoration indication is received, the backup P-CSCF server 150B may implement a call flow to bypass traditional device 120 registration checks. The additional information may include a restoration process notification. The restoration indication in the header indicates to the backup P-CSCF server 150B that an exception to regular message handling is to occur. The backup P-CSCF server 150B may normally reject the call message sent to a device 120 that is not registered with backup P-CSCF server 150B. Based on an invite with the restoration indicator, however, the backup P-CSCF server 150B may complete calls to a device 120 that is not registered with that backup P-CSCF server 150B. The call may be completed without change to the device 120.

The S-CSCF server 152 may add a restoration indicator to an Invite (e.g. to a SIP Route header) transmitted to the back-up P-CSCF server 150B. An example route header may be: "Route: sip:76.96.207.117; transport=udp; lr; p-cscf-restoration". The backup P-CSCF server 150B may be preconfigured in the S-CSCF server 152. A backup P-CSCF server 150B may be preconfigured by the system operator.

Based on a SIP Invite with restoration indicator in step 9, the backup P-CSCF 150B may complete calls to the device 120 that was not previously registered with that backup P-CSCF 150B. To do so, the backup P-CSCF 150B may transmit, in step 10, the SIP Invite to the device 120. The device 120 may return, in step 11, a SIP 200 OK message, or an appropriate SIP error response if the device 120 cannot accept the call, to the backup P-CSCF 150B. The backup P-CSCF 150B may send, in step 12, either a SIP 200 OK message or a SIP error response to the S-CSCF 152. The S-CSCF 152 may send, directly or indirectly, a SIP 200 OK message or a SIP error response to the SBC 170, in step 12.

Figure 3:
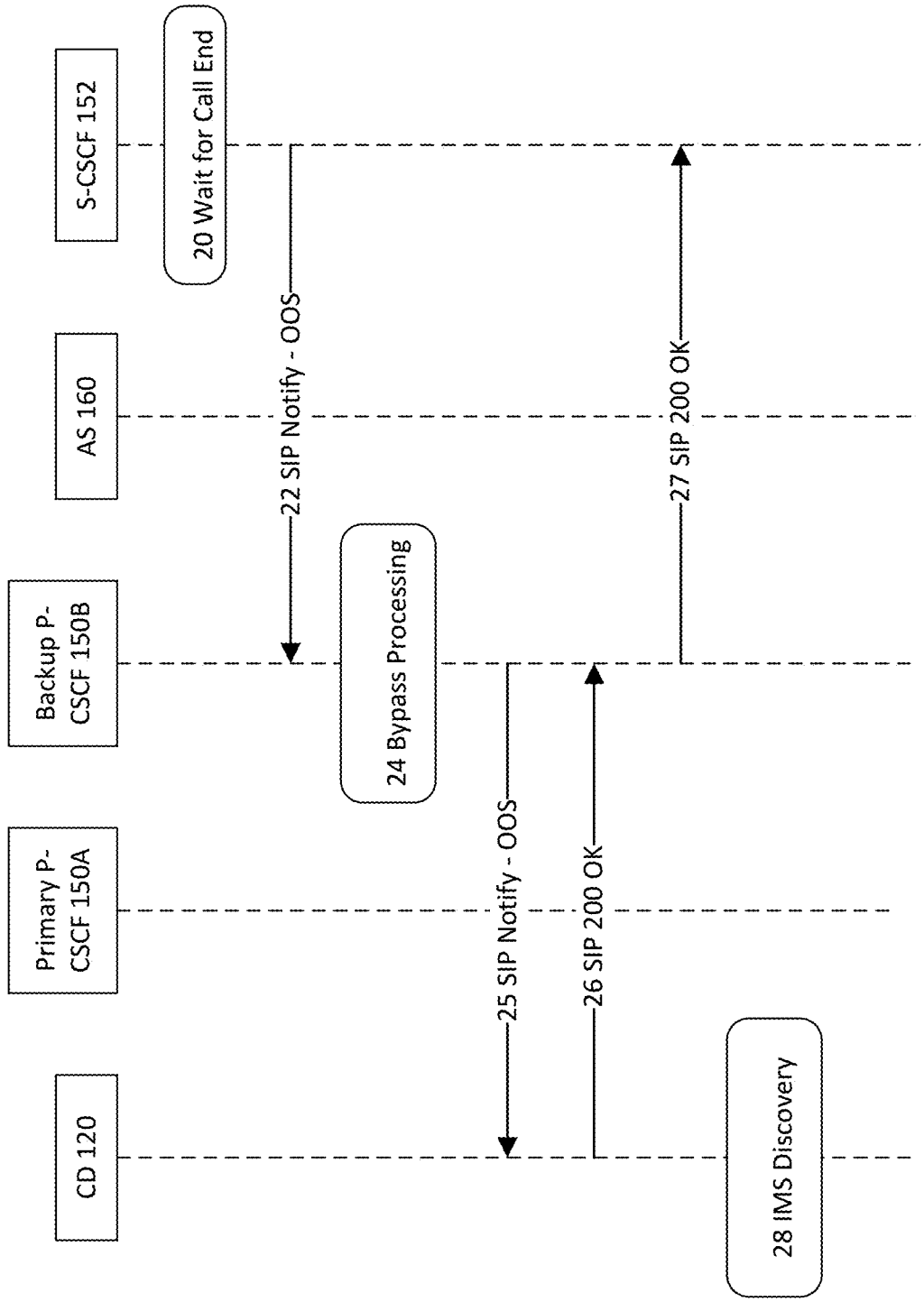
FIG. 3 shows example message flows for an IMS system using service restoration with a restoration indicator in an SIP invite.

FIG. 3 is a message diagram showing example message flows for restoration of service to a device 120. By sending additional information, such as an out of service indicator, in a SIP Notify message via an alternative/backup P-CSCF server, a device 120 may be notified of the need to register with a P-CSCF server 150. A SIP Notify message may indicate the computer device's 120 registration with the IMS Core 110 has been terminated and may include additional information including reasons codes indicating the reason for terminating the registration. The information may be included in a subscription state portion of a header. The reason codes may indicate the primary P-CSCF server 150A was determined to be unavailable to serve the device 120. Examples of the reason codes may include: (1) reason=p-cscf-restarted, which may indicate that the primary P-CSCF server 150A has restarted and that the device 120 may choose to register with the same P-CSCF server; and (2) reason=p-cscf-oos, which may indicate that the primary P-CSCF server 150A is OOS, is unreachable, or has failed, which may indicate that the device 120 should register with a different P-CSCF server. The S-CSCF server 152 may wait for a call in progress to end in step 20. Based on a determined end of a call, the S-CSCF server 152 may transmit a SIP Notify message, in step 22, to the backup P-CSCF 150B.

Based on the SIP Notify message, in step 22, with an out of service or failure indicator in the ROUTE header or any other header, the backup P-CSCF server 150B may bypass, in step 24, the device 120 registration checks and may forward the message to the device 120. In step 25, the device 120 may receive an out of service reason code. An out of service or failure indicator may indicate to the device 120 that the primary P-CSCF server 150A is not available or is not likely to be available for communication or registration. The device 120 may determine, based on a reason code such as an out of service or failure indicator, that an alternative P-CSCF server 150B is preferred or necessary for registration. Based on receiving such a reason code, the device 120 may execute, in step 28, additional processing to restore based on the type of reason codes provided. The additional processing may include a basic P-CSCF discovery process to register with a different P-CSCF instance.

A SIP Notify message may be received from the backup P-CSCF server 150B, in step 25. The device 120 may respond with a SIP 200 OK message, in step 26, transmitted to the backup P-CSCF server 150B. The backup P-CSCF server 150B may transmit a SIP 200 OK message in step 27 transmitted to the S-CSCF server 152. In step 28, the device 120 may execute additional processing to restore based on the type of reason codes provided.

A device may establish a network connection. The device may register with the network element responsible for transmitting message signals to a target user device or outside networks. Call processing may include a standard P-CSCF discovery and IMS registration process. In an IMS Registration process, not shown, the device 120 may establish IP connectivity and may send a query to the Dynamic Host Configuration Protocol (DHCP) server for retrieving the device's 120 IP address. The DHCP response may include a Fully Qualified Domain Name (FQDN) of the P-CSCF server. In step 1 (FIG. 2), the device 120 may perform a series of DNS queries, including performing: 1) Name Authority Pointer (NAPTR) lookup, 2) Service (SRV) record lookup and 3) A/AAAA lookup specifying IP address of a given host for IPv4 and IPv6, respectively. In response to the DNS query, the IP address of the P-CSCF server may be returned. This may be known as the DHCP-DNS procedure for P-CSCF discovery. However, in some cases, it may be possible that the FQDN of the P-CSCF server may be pre-configured in the device 120. In these scenarios, the device 120 may directly query the DNS server and may retrieve the IP address of the P-CSCF server.

The device 120 may send a SIP REGISTER request to the P-CSCF server 150 to register the device 120 in the IMS Core 110 network. The device 120 may send a SIP INVITE request to the P-CSCF server 150 to which the device 120 may be previously registered. The P-CSCF server 150 may send a registration request to an I-CSCF server 154. This may be known as the I-CSCF discovery process. The I-CSCF server 154 may send a User-Authorization-Request (UAR) to the HSS 156 and may receive a User-Authorization-Answer (UAA) from the HSS. The I-CSCF server 154 may send the registration request to the S-CSCF server 152. The S-CSCF server may send a Media-Authorization-Request (MAR) to the HSS 156 and may receive a Media-Authorization-Answer (MAA) from the HSS. The S-CSCF server 152 may return the 401 unauthorized message to the I-CSCF server 154, which may forward the SIP 401 unauthorized message indicating that user authentication may be required to the P-CSCF server 150, which may forward the 401 unauthorized message to the device 120.

The device 120 may send registration messages with authentication information to the P-CSCF server 150. The P-CSCF server 150 may send a registration request to an I-CSCF server 154. The I-CSCF server 154 may send a User-Authorization-Request (UAR) to the HSS 156 over a diameter link and receives a User-Authorization-Answer (UAA) from the HSS 156. The I-CSCF server 154 may send a registration request to the S-CSCF server 152. The S-CSCF server 152 may send a Server-Assignment-Request (SAR) to the HSS 156 and may receive a Server-Assignment-Answer (SAA) from the HSS 156. The S-CSCF server 152 may return the SIP 200 OK message to the I-CSCF server 154.

The S-CSCF server 152 may send a registration request to Application Server(s) 160 (for example the telephony application server (TAS)) and may receive the SIP 200 OK message from the AS 160. The I-CSCF server 154 may send a SIP 200 OK message to the P-CSCF server 150. The P-CSCF server 150 may forward the SIP 200 OK message to the device 120.

Figure 4:
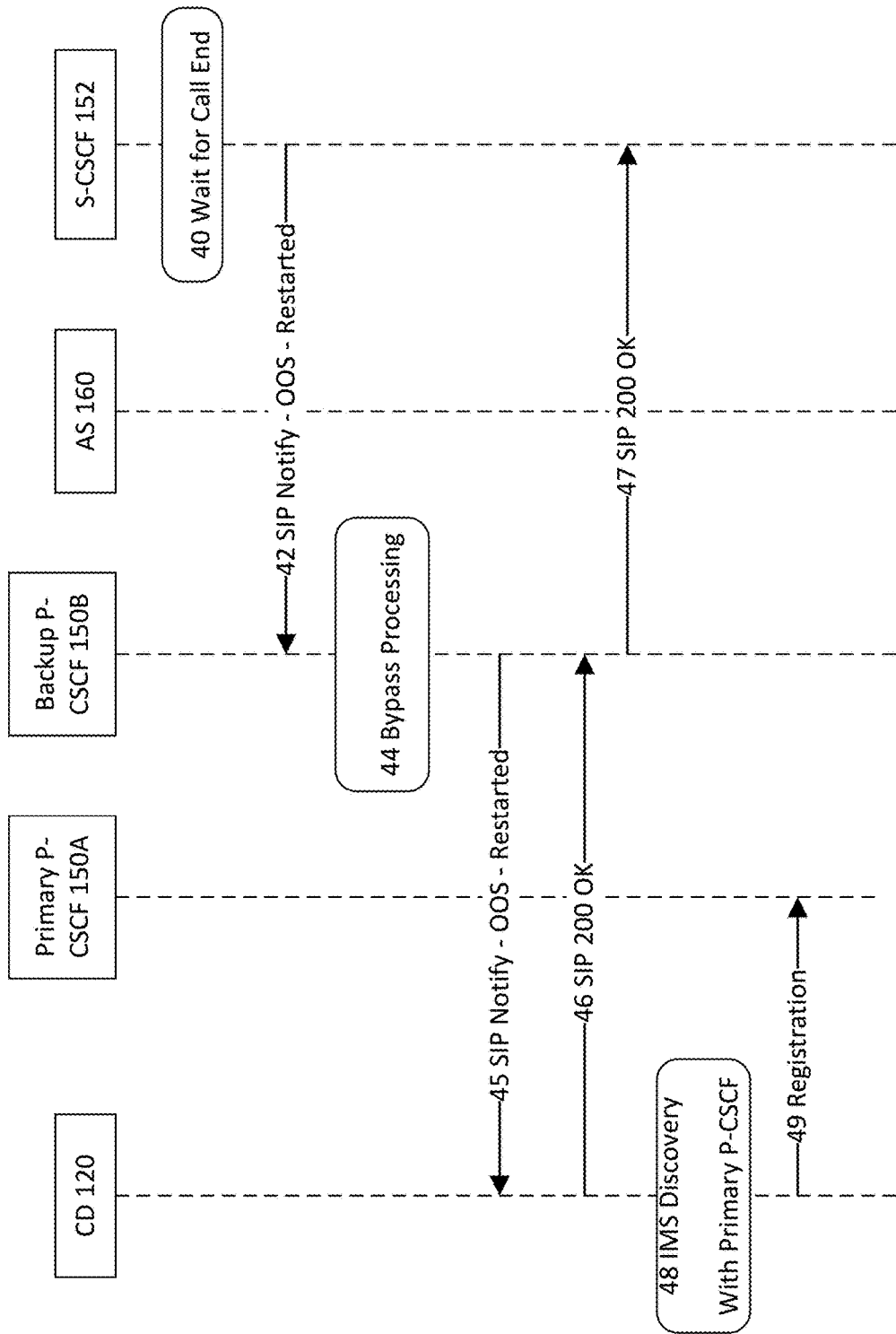
FIG. 4 shows example message flows for service restoration via reregistration using an alternative/backup P-CSCF server.

FIG. 4 is a message flow chart showing example message flows for service restoration by sending additional information, such as a restart indicator, in SIP notification via an alternative/backup P-CSCF server. In FIG. 4, re-registration of a device 120 with a primary P-CSCF server 150A that was previously out of service may be initiated. This re-registration may proceed based on a SIP Notify message including additional information indicating that the primary P-CSCF server 150A Restarted as the cause of the primary P-CSCF server 150A being out of service. A SIP Notify message may include additional information in the Subscription-State header. The information may include reasons codes indicating the reason the primary P-CSCF server 150A was determined to be unavailable to serve the device 120. For example, the additional information may be Subscription-State: terminated; reason=p-cscf-restarted. A SIP Notify message may include the additional information in a registration information document, which may be presented in an XML format. While the following description may generally refers to the additional information such as reason codes in a header, that additional information may alternatively or additionally be present in a registration information document. The additional information of a registration information may be present in the body of a SIP message. The S-CSCF server 152 may wait for a call in progress to end in step 40. The S-CSCF server 152 may transmit a SIP Notify message, in step 42, to the backup P-CSCF server 150B.

Based on the SIP Notify message with restoration indicator in step 42, the backup P-CSCF server 150B may bypass, in step 44, the device 120 registration checks and may forward the message to the device 120. Based on the SIP Notify message, in step 45, received from the backup P-CSCF server 150B, the device 120 may respond with a SIP 200 OK message in 46 transmitted to the backup P-CSCF server 150B. The backup P-CSCF server 150B may transmit a SIP 200 OK message in 47 transmitted to the S-CSCF server 152. Based on the restart code, the device 120 may execute, in step 48, additional processing to restore service based on the type of reason codes provided. The additional processing may include a registration process with the primary P-CSCF server 150A, with which device 120 was previously registered, or a secondary P-CSCF server 150B.

Figure 5:
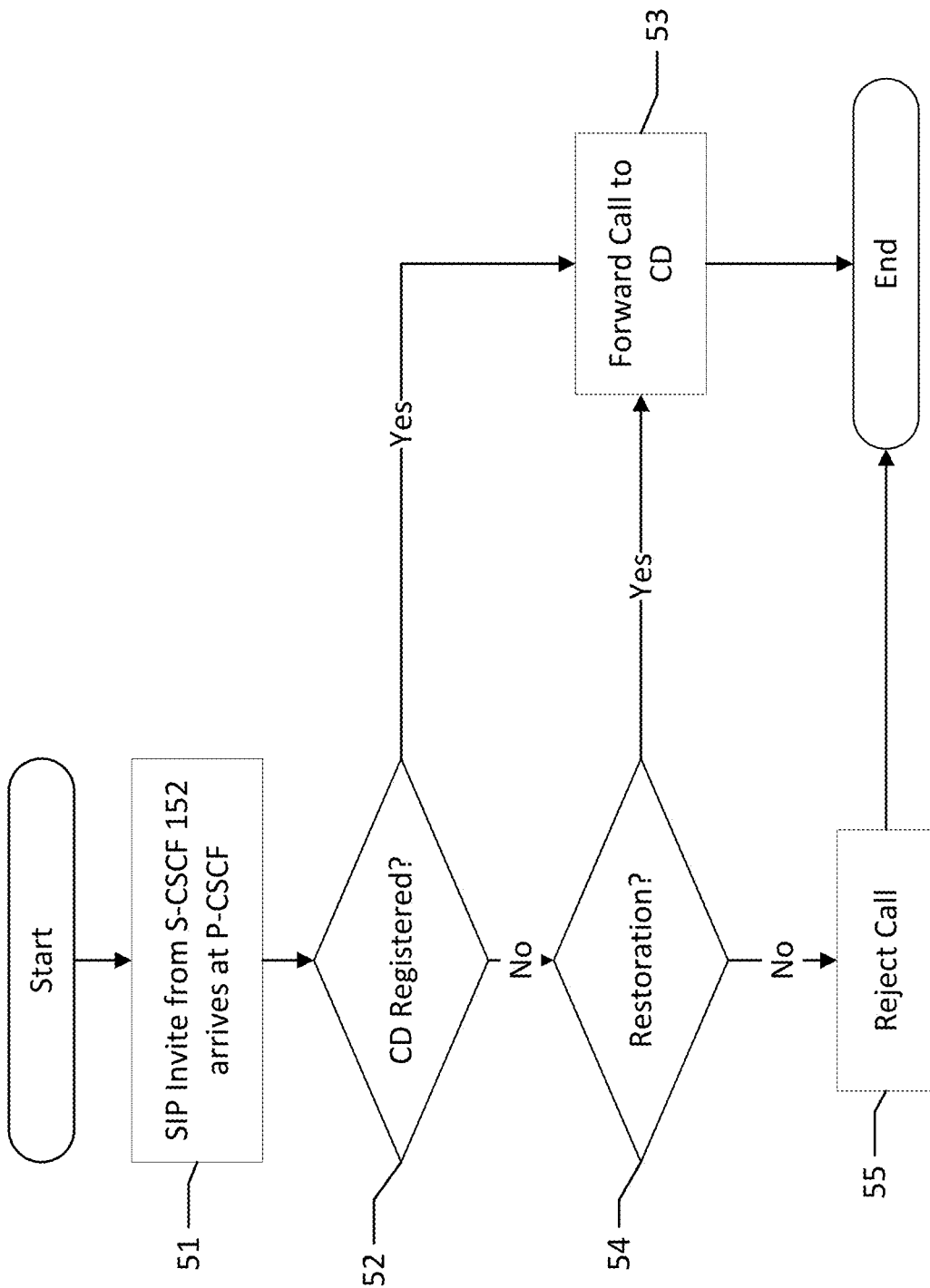
FIG. 5 shows example flowchart following receipt of incoming call with a restoration indicator.

FIG. 5 is a flow chart showing example operations that may be performed by P-CSCF devices, which may include a primary P-CSCF server 150A and/or any secondary P-CSCF server 150B. One or more of the operations of FIG. 5 may also or alternatively be performed by one or more other computing devices. Based on an incoming call, the P-CSCF device may receive, in step 51, a SIP Invite message from the S-CSCF server 152. Based on a determination that the device 120 is registered, in step 52, with the receiving P-CSCF device (such as a primary P-CSCF server 150A), the P-CSCF device may begin call termination processing (services to allow the call to begin) and may forward the call to the device 120, in step 53. Based on a determination that the device 120 is not registered with the receiving P-CSCF device (such as a backup P-CSCF server 150B), the P-CSCF device may determine, in step 54, if the SIP message includes a restoration indication. Based on a determination that the restoration indication is included in the message, the receiving P-CSCF device may begin call termination processing and may forward the call to the device 120, in step 53. Based on a determination that the restoration indication is not included in the message, the receiving P-CSCF device may reject the call, in step 55.

Figure 6:
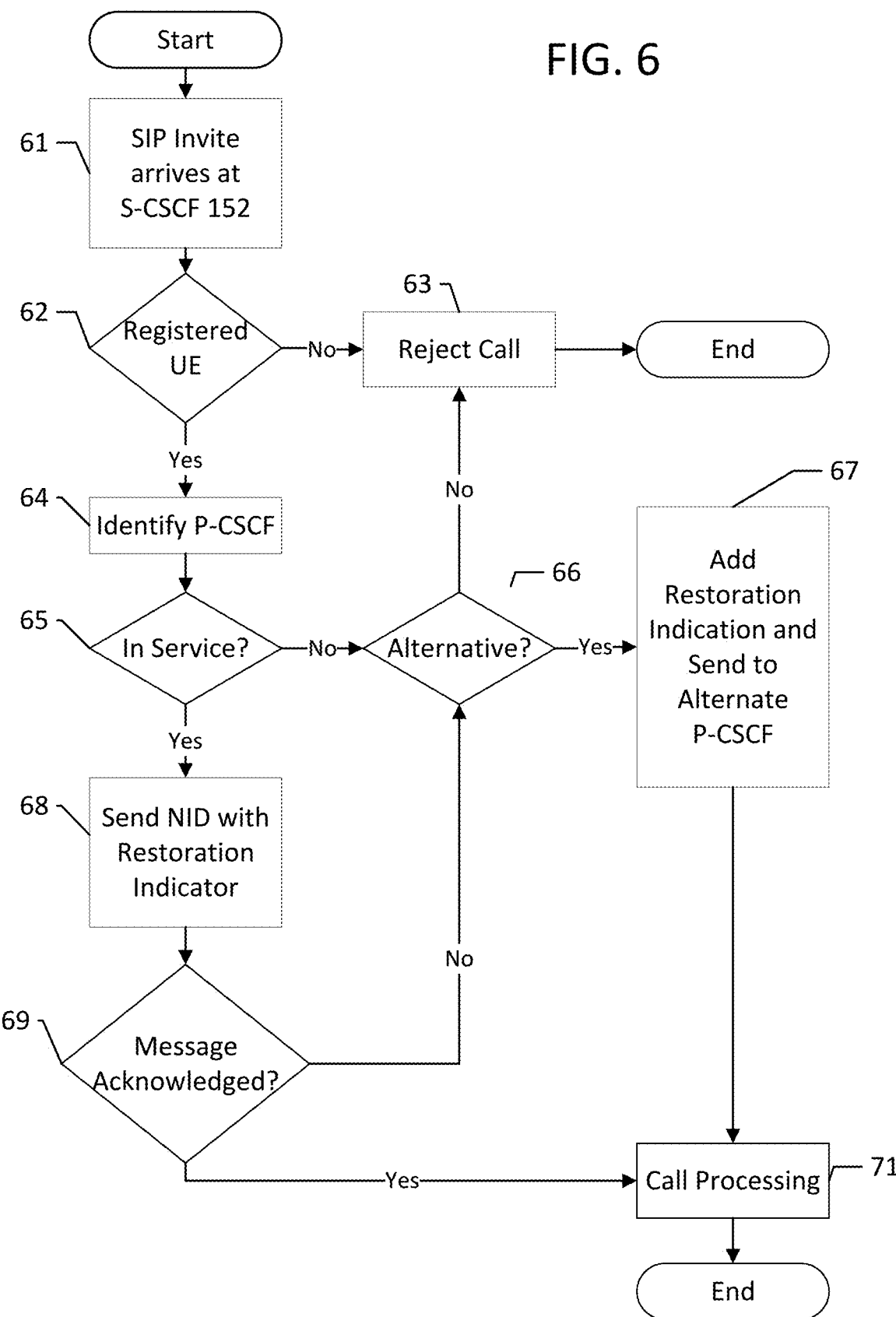
FIG. 6 shows example flowchart for processing an incoming call based on a P-CSCF server failure or a P-CSCF server restart.

FIG. 6 is a flow chart showing example operations that may be performed, e.g., by the S-CSCF server 152, in connection with determining whether to transmit messages to a target device 120 with one of a primary P-CSCF server 150A or at least one alternative P-CSCF server 150B. Based on an incoming call, in step 61, the S-CSCF server 152 may determine, in step 62, if the device 120 identified by the call request is registered with the IMS Core 110. Based on a determination that the device 120 is not registered with the IMS Core 110, the call may be rejected, in 63, by the S-CSCF server 152, and the processing of that request may be terminated.

Based on a determination that the device 120 is registered with the IMS Core 110, the S-CSCF server 152 may determine, in 64, a primary P-CSCF server 150A associated with the registered device 120. The S-CSCF server 152 may determine whether the primary P-CSCF server 150A associated with the registered device 120 is in service, in step 65. The S-CSCF server 152 may determine the status of the P-CSCF server 150A based on a lack of response to other messages transmitted to the P-CSCF server 150A or information received from other IMS elements, such as an application server 160.

The S-CSCF server 152 may determine, in step 65, that a primary P-CSCF server 150A is not in service based on a lack of response. Based on a determination that the P-CSCF server 150A is not in service, in step 65, the S-CSCF server 152 may determine whether an alternative P-CSCF server 150 is available for message processing. Based on a determination that no backup P-CSCF server 150B is available, in step 66, the call may be rejected in step 63 by the S-CSCF server 152 and the processing of that request may be terminated.

Based on a determination that a backup P-CSCF server 150B is available, in step 66, the call may be processed using a restoration procedure in step 67 (e.g., in connection with the use of the reason codes discussed above). For example, the S-CSCF server 152 may add additional information, such as a reason code (e.g. restoration indication) to a SIP Invite message. The additional information may allow the incoming call to be routed via a backup P-CSCF server 150B with which the device 120 was not previously registered. Based on an acknowledgement from the device 120, such as a SIP 200 OK message, the call may be connected and the IMS Core 110 may proceed with any other call processing in step 71.

The S-CSCF server 152 may determine that a primary P-CSCF server 150A is in service, in step 65. Based on a determination that a primary P-CSCF server 150A is in service, in step 68, the S-CSCF server 152 may send a network-initiated deregistration (NID) with a restoration indicator. The S-CSCF 152 server may determine whether the NID message has been acknowledged in step 69. If the primary P-CSCF 150A server has not provided a SIP 200 OK message or another response that may allow the call to proceed, the S-CSCF server 152 may determine, in step 69, that the message has not been acknowledged.

If the S-CSCF server 152 has not received a SIP 100 Trying message or other acknowledgement, in step 69, the S-CSCF server 152 may determine whether the call should be routed to a backup P-CSCF server. If the NID message is not acknowledged in step 69, the S-CSCF server 152 may whether a backup P-CSCF server 150B is available in step 66. If a backup P-CSCF server 150B is determined to be available, in step 66, the call may be processed using a restoration procedure of step 67 (e.g., in connection with steps 9-13 of FIG. 2). As discussed above, based on a determination that a backup P-CSCF server 150B is available, in step 66, the call may be processed using a restoration procedure in step 67, in keeping the reason codes discussed above. A message with a restoration indication may be followed by a notification message (e.g., as a SIP Notify—OOS Restarted messages sent in step 42 and 45 of FIG. 4), which may indicate to the device 120 that the device 120 should re-register with the primary P-CSCF server 150A. For example, this may occur when the call is complete. The device 120 may be directed to register with a different P-CSCF device when the call is completed.

If the primary P-CSCF server 150A has provided a SIP 100 Trying response message, the S-CSCF server 152 may continue to attempt to send a NID with a restoration message. In step 69, the S-CSCF server 152 may determine that the primary P-CSCF server 150A has provided a response indicating that the primary P-CSCF server 150A is trying to process the SIP Invite message (e.g. a SIP 100 Trying message or a SIP 200 OK message). If the NID message is acknowledged (e.g. a SIP 200 OK message), in step 69, the S-CSCF server 152 may continue call processing in step 71. That is, the call may be connected and the call may proceed with any other call processing in step 71. Based on a NID message received from the S-CSCF 152 server, a device 120 may perform a DNS lookup process to discover the preferred IMS CSCF instances for registration (e.g., as in step 28 in FIG. 3).

Whenever a P-CSCF server 150 goes through a restart process, the P-CSCF server may lose information of the device 120 that it has cached in the resident memory of the P-CSCF server. The device 120 and other outside devices may not be aware of the restart process. As such, the S-CSCF server 152 may send the NID message, of step 68, to initiate a re-registration by the device 120 with the P-CSCF server 150. The NID message may include a reason code or restoration indication (e.g. in a message header as used in step 9 of FIG. 2). The restoration indication may also include a restart indication that indicates to the device 120 that the device may register with the same P-CSCF server with which the device was previously registered.

Figure 7:
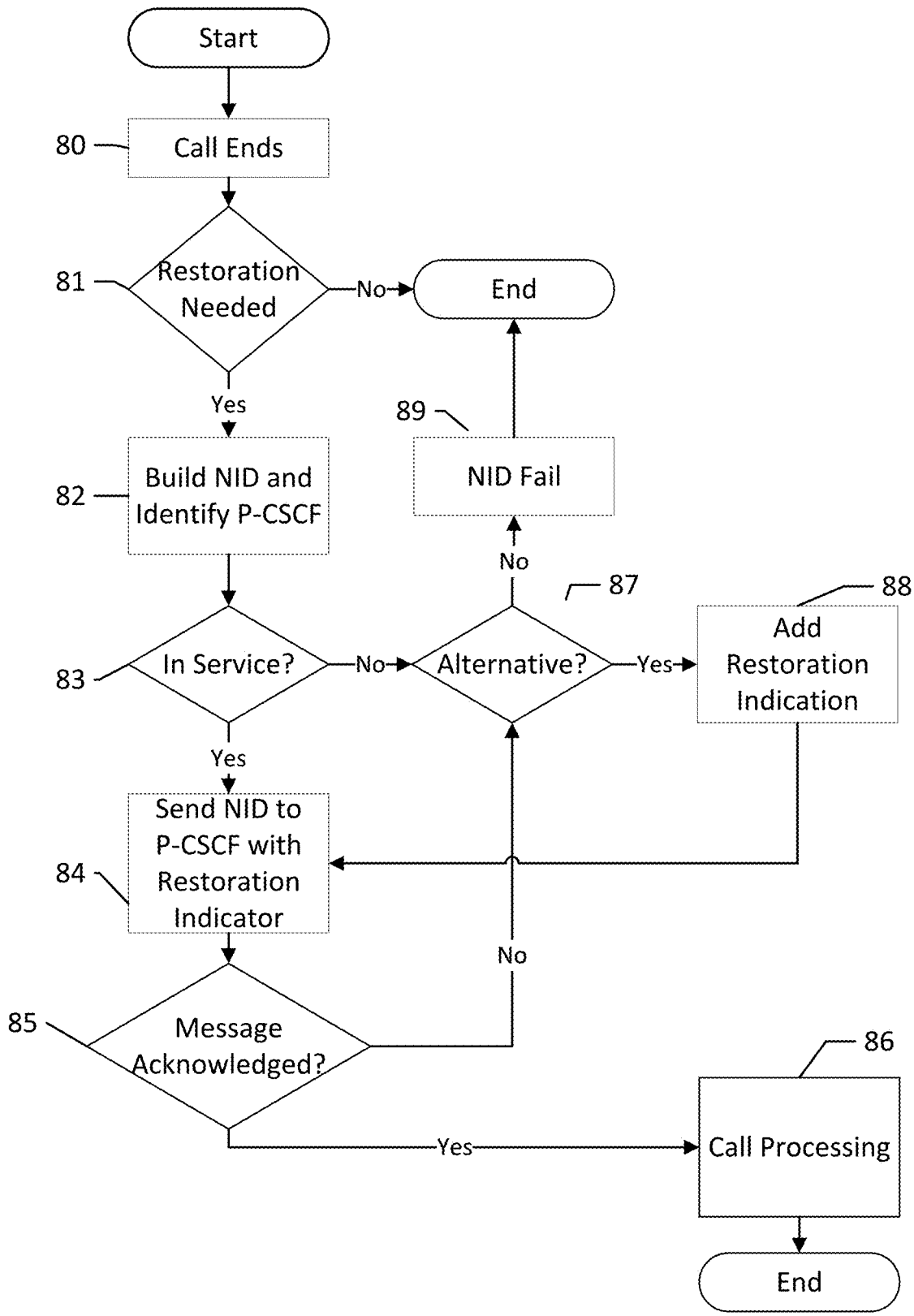
FIG. 7 shows example flowchart for processing restoration based on call completion.

The S-CSCF server 152 may restore a registration state of the call targeted device 120 with a functional P-CSCF server, such as the backup P-CSCF server 150B through which the call was completed. For, this may be based on a call ending. The S-CSCF server 152 may also de-register any other device's 120 registered with the P-CSCF server 150A which was identified as non-functional in connection with the call process. FIG. 7 is a flowchart showing example operations that may be performed for device 120 deregistration, e.g., if the S-CSCF server 152 determines the need for service restoration in connection with call completion. Although FIG. 7 is discussed using the example of operations performed by S-CSCF server 152, one or more operations of FIG. 7 may also or alternatively be performed by one or more other computing devices.

To determine if the S-CSCF server 152 may re-register any device's 120 registered with a P-CSCF server identified as non-functional, the S-CSCF server 152 may determine if the non-functional P-CSCF server was undergoing a restart to return to a functional state, or if the non-functional P-CSCF server is out of service or has failed. In connection with the call ending (e.g., in connection with step 40 of FIG. 4), a re-registration process may begin. If a primary P-CSCF server 150A identified as non-functional was undergoing a restart to return to a functional state, the S-CSCF server 152 may send a SIP Notify with the indicator of Subscription State: terminated towards the device 120, (e.g., in used in steps 42 and 45 of FIG. 4). Based on receipt of that notification message, the device 120 may begin a registration process with the primary P-CSCF server 150A (e.g., in shown in step 49 of FIG. 4).

Based on the end of a call, the S-CSCF 152 server may begin deregistration processes for devices 120 registered with the non-functional P-CSCF server 150A. For example, the S-CSCF server 152 may begin a deregistration process for the call targeted device 120. In addition, the S-CSCF server 152 may allow other devices 120 to re-register with a now functional primary P-CSCF server 150A as the other devices 120 reach their registration expiry time. The other devices 120 may be allowed to register with a functional P-CSCF server, such as backup P-CSCF server 150B, if the non-functional P-CSCF server 150A has not been restored to be in a functional state when the other devices 120 reach their registration expiry time, indicating that those devices may need to refresh their registration.

Based on a call completion, in step 80, the S-CSCF server 152 may take measures to restore service to the device 120. The S-CSCF server 152 may send out a network-initiated deregistration (NID) message to the affected devices 120. Based on a NID message received from the S-CSCF 152 server, a device 120 may perform a DNS lookup process to discover the preferred IMS CSCF servers for registration (e.g., in shown in step 28 in FIG. 3).

In step 81, the S-CSCF server 152 may determine if a P-CSCF restoration indicator has been sent to a device 120. Based on a determination that the restoration indicator has not been transmitted to the device 120, the process may end without an NID message being generated. Based on a determination that a restoration indicator has been transmitted, in step 81 to the device 120, the S-CSCF server 152 may build a NID message, in 82, and may identify a P-CSCF server to send the NID message to the device 120.

The S-CSCF server 152 may determine, in step 83, whether the P-CSCF server 150 associated with the registered device 120 is in service. The S-CSCF server 152 may determine the status of the P-CSCF server 150 based on a lack of response to other messages transmitted to the P-CSCF server 150 or information received from other elements, such as a TAS 160.

In step 83, the S-CSCF server 152 may determine if a particular P-CSCF server 150 is in service. If the particular P-CSCF server 150 is in service, the S-CSCF server 152 may transmit the NID, in step 84, to the particular P-CSCF server 150. For example, if the primary P-CSCF server 150A has provided a SIP 200 OK response message, the NID message may be transmitted to the primary P-CSCF server 150A. If the particular P-CSCF server 150 is not in service, the S-CSCF server 152 may determine, in step 87, an alternative P-CSCF server for processing NID messages.

Based on a determination that the particular P-CSCF server 150 is in service, the S-CSCF server 152 may transmit the NID message, in step 84, to the determined particular P-CSCF server 150. A response received by the S-CSCF server 152 may determine the next step in step 85. Based on an affirmative response message (e.g. a SIP 200 OK or SIP 100 Trying response) that may be received, call processing may continue, in step 86. If no response is received by the S-CSCF server 152, the S-CSCF server 152 may determine that particular P-CSCF server 150 is either not functional or not available, and the S-CSCF server 152 may proceed to step 87.

The S-CSCF server 152 may determine, in step 87, an alternative P-CSCF server for NID processing. Based on a determination, in step 87, by S-CSCF server 152 that an alternative P-CSCF server for NID message processing is available, the S-CSCF server 152 may add a restoration indication or information, in step 88, to the message to be transmitted to the alternative P-CSCF server. Based on restoration information in a SIP message, in step 88, the S-CSCF server 152 may transmit a NID message to the determined alternative P-CSCF server (e.g. the P-CSCF server 150B), in step 84, to be transmitted to the device 120.

The NID message transmitted to the alternative P-CSCF server 150, and from the alternative P-CSCF server to the device 120, may include an indication that the subscription state of the device 120 is to be terminated. The NID or other registration termination messages may also include an indication of the reason the subscription state of the device 120 is to be terminated. The indication of the reason the subscription state of the device 120 is to be terminated may be an indication that the P-CSCF server is out of service or that the P-CSCF server has failed. Based on such a message, the device 120 may begin, based on the indicated reason, P-CSCF server discovery and registration procedures. The device 120 may be configured to ignore or bypass, based on the indicated reason in a subscription state termination message or an NID message, attempts to register with a P-CSCF server indicated to be out of service or indicated to have failed, or the device 120 may rely on the S-CSCF server 152 to have deprioritized or delisted the non-functional P-CSCF server (e.g. with the DNS) prior to sending the subscription state terminated message.

If the primary P-CSCF server 150A with which the device 120 is registered is not in service, the S-CSCF server 152 may determine, in step 87, if an alternative P-CSCF device such as backup P-CSCF server 150B is available. If a backup P-CSCF server 150B is determined to be available, in step 88, the call may be processed using a restoration procedure (e.g. the process shown in steps 9-13 of FIG. 2). The S-CSCF server 152 may in step 84 transmit an NID message to the alternative P-CSCF server identified in step 87. Based on a determination that no alternative or backup P-CSCF server 150B is available, in step 87, the NID messaging process may fail. Based on determination that the NID process in 89 has failed, the S-CSCF server 152 may wait for the device 120 to reach its expiry time for that device 120 to register with a P-CSCF server in a standard device 120 registration process.

Figure 8:
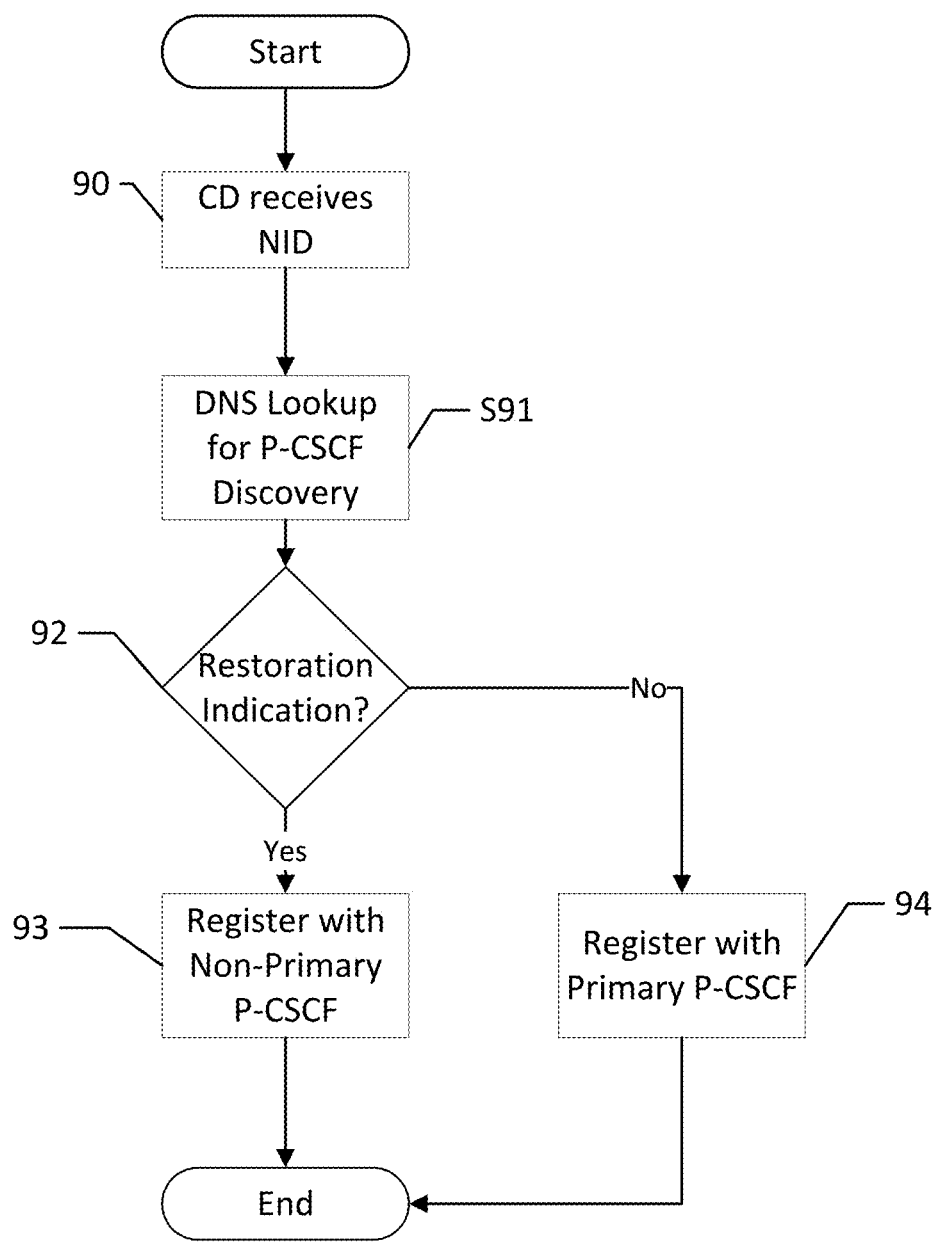
FIG. 8 shows example flowchart for user device service restoration based on call completion.

Based on a network-initiated deregistration (NID) message transmitted from either a primary P-CSCF server 150A or alternative P-CSCF server 150B, the device 120 may begin a process of registering with the IMS Core 110. FIG. 8 is a flowchart showing operations associated with device 120 IMS service restoration or registration in connection with call completion and using a NID message. Although FIG. 8 is described in using operations of the device 120 as an example, one or more of the operations of FIG. 8 could also or alternatively be performed by one or more other devices.

The computing device 120 may receive the NID message in step 90. Based on the NID message in step 90, the device 120 may begin a DNS lookup process with DNS 140 to discover the prioritized P-CSCF for registration. The device 120 may determine, in step 92, if a restoration indication is present in the NID received in step 90. If restoration indication or information has been received by device 120 in step 93, the device 120 may be configured to register with a non-primary P-CSCF server 150B. If no restoration indication or information has been received by device 120 in step 94, the device 120 may be configured to register with a primary P-CSCF server 150A.

Figure 9:
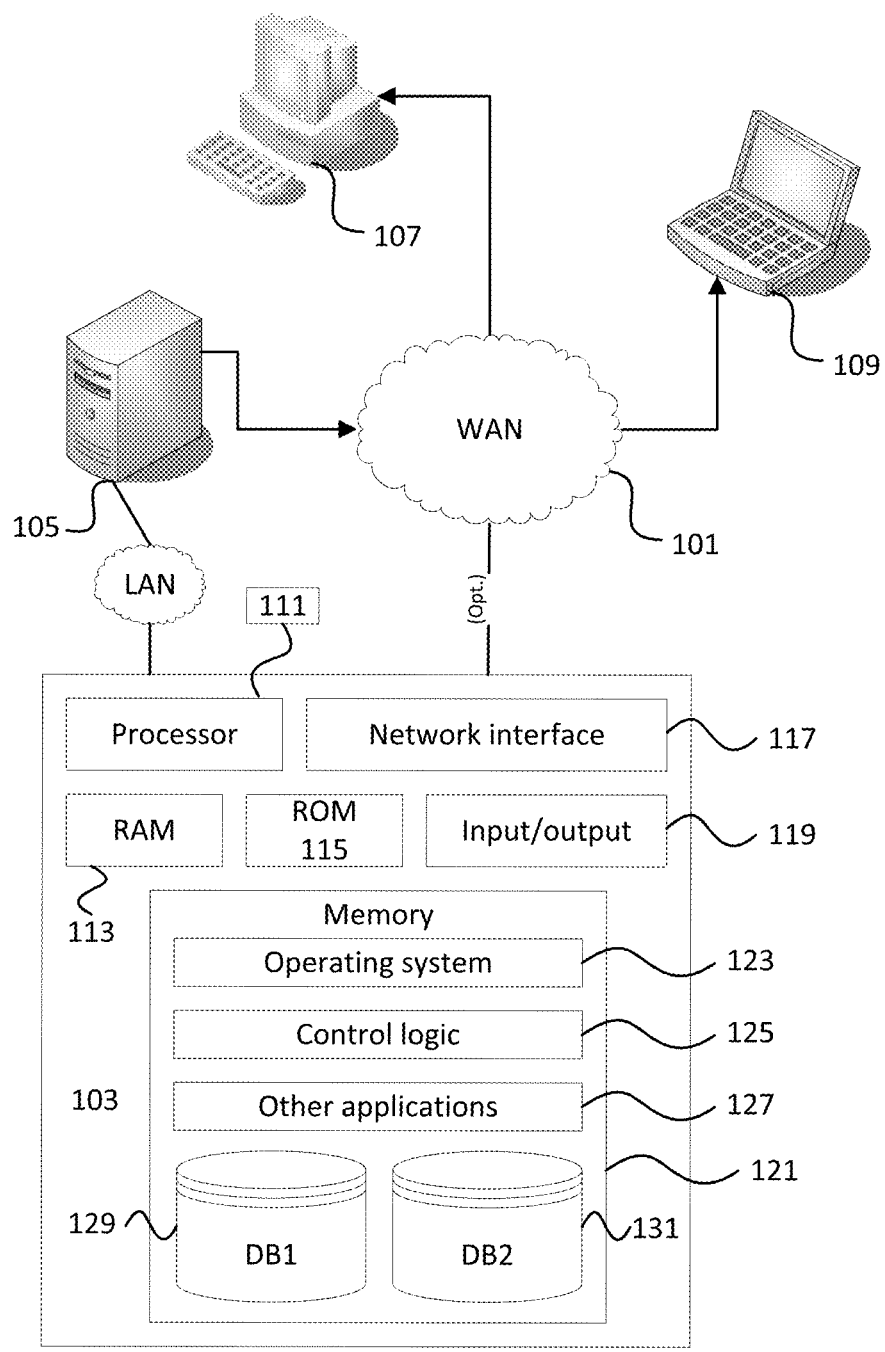
FIG. 9 shows an example device architecture.

Each of elements 140, 150, 152, 154, 156, and 160 may be any type of computing device, e.g., any type of computer, server, or other data processing device. FIG. 9 shows an example architecture of a data server that may be a computing device used to implement any of the elements described herein (e.g., any of the devices 140, 150, 152, 154, 156, and 160). The data server 103 may include a processor 111 controlling overall operation of the data server 103. The data server 103 may further include RAM 113, ROM 115, a network interface 117, input/output interfaces 119 (e.g., keyboard, mouse, display, printer, etc.), and memory 121. The I/O interfaces 119 may include a variety of interface units and drives for reading, writing, displaying, and/or printing data or files. The memory 121 may further store operating system software 123 for controlling overall operation of the data processing device 103, control logic 125 for instructing the data server 103 to perform operations described herein, and other application software 127 providing secondary, support, and/or other functionality which may or may not be used in conjunction with other features described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

The memory 121 may also store data used in performance of one or more operations described herein, including a first database 129 and a second database 131. The first database may include the second database (e.g., as a separate table, report, etc.). For example, the information may be stored in a single database, or separated into different logical, virtual, or physical databases, depending on system design. Devices 105, 107, 109 may have similar or different architecture as described with respect to the data server 103. The functionality of data processing device 103 (or the devices 105, 107, and/or 109) as described herein may be spread across multiple data processing devices, for example, to distribute processing load across multiple computers, to segregate transactions based on geographic location, user access level, quality of service (QoS), etc.

One or more features described herein may be implemented using computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. The functionality of the program modules may be combined or distributed as desired in various features. In addition, the functionality may be implemented in whole or in part in firmware or hardware equivalents such as integrated circuits, field programmable gate arrays (FPGA), and the like. Particular data structures may be used to more effectively implement one or more features, and such data structures are contemplated within the scope of computer executable instructions and computer-usable data described herein.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a computing device, a first call invite for a first user device, wherein the first user device is not registered for call handling services with the computing device;
   handling the first call invite by sending the first call invite to the first user device, wherein the first call invite indicates service restoration; and
   receiving, from the first user device, a response to the first call invite.

2. The method of claim 1, further comprising:
   before handling a call invite for an unregistered user device, verifying that the call invite indicates service restoration.

3. The method of claim 1, wherein the first call invite comprises one or more of: an indication that a primary computing device is unavailable, an indication that the primary computing device is restarting, an indication that the primary computing device is out of service, an indication that the primary computing device has failed, or a reason that the primary computing device is unable to process the first call invite.

4. The method of claim 1, further comprising:
   establishing, based on the first call invite, communication between the first user device and a source device that originated the first call invite.

5. The method of claim 1, further comprising:
receiving, after a call associated with the first call invite, a notification that a primary computing device, with which the first user device is registered, is restarting; and
causing, based on the notification that the primary computing device is restarting, the first user device to re-register with the primary computing device.

6. The method of claim 1, further comprising:
receiving, after a call associated with the first call invite, a notification that a primary computing device, with which the first user device is registered, is out of service; and
causing, based on the notification that the primary computing device is out of service, the first user device to register with another computing device other than the primary computing device.

7. The method of claim 1, further comprising:
sending, to the first user device and after a call associated with the first call invite, a network-initiated deregistration message to cause the first user device to perform a DNS look up for a new primary computing device.

8. One or more non-transitory computer-readable media storing instructions that, when executed, cause:
receiving, by a computing device, a first call invite for a first user device, wherein the first user device is not registered for call handling services with the computing device;
handling the first call invite by sending the first call invite to the first user device, wherein the first call invite indicates service restoration; and
receiving, from the first user device, a response to the first call invite.

9. The one or more non-transitory computer-readable media of claim 8, wherein the instructions, when executed, further cause:
before handling a call invite for an unregistered user device, verifying that the call invite indicates service restoration.

10. The one or more non-transitory computer-readable media of claim 8, wherein the first call invite comprises one or more of: an indication that a primary computing device is unavailable, an indication that the primary computing device is restarting, an indication that the primary computing device is out of service, an indication that the primary computing device has failed, or a reason that the primary computing device is unable to process the first call invite.

11. The one or more non-transitory computer-readable media of claim 8, wherein the instructions, when executed, further cause:
establishing, based on the first call invite, communication between the first user device and a source device that originated the first call invite.

12. The one or more non-transitory computer-readable media of claim 8, wherein the instructions, when executed, further cause:
receiving, after a call associated with the first call invite, a notification that a primary computing device, with which the first user device is registered, is restarting; and
causing, based on the notification that the primary computing device is restarting, the first user device to re-register with the primary computing device.

13. The one or more non-transitory computer-readable media of claim 8, wherein the instructions, when executed, further cause:
receiving, after a call associated with the first call invite, a notification that a primary computing device, with which the first user device is registered, is out of service; and
causing, based on the notification that the primary computing device is out of service, the first user device to register with another computing device other than the primary computing device.

14. The one or more non-transitory computer-readable media of claim 8, wherein the instructions, when executed, further cause:
sending, to the first user device and after a call associated with the first call invite, a network-initiated deregistration message to cause the first user device to perform a DNS look up for a new primary computing device.

15. An apparatus comprising:
one or more processors; and
memory storing instructions that, when executed by the one or more processors, configure the apparatus to:
receive a first call invite for a first user device, wherein the first user device is not registered for call handling services with the apparatus;
handle the first call invite by sending the first call invite to the first user device, wherein the first call invite indicates service restoration; and
receive, from the first user device, a response to the first call invite.

16. The apparatus of claim 15, wherein the instructions, when executed by the one or more processors, further configure the apparatus to:
before handling a call invite for an unregistered user device, verify that the call invite indicates service restoration.

17. The apparatus of claim 15, wherein the first call invite comprises one or more of:
an indication that a primary computing device is unavailable, an indication that the primary computing device is restarting, an indication that the primary computing device is out of service, an indication that the primary computing device has failed, or a reason that the primary computing device is unable to process the first call invite.

18. The apparatus of claim 15, wherein the instructions, when executed by the one or more processors, further configure the apparatus to:
establish, based on the first call invite, communication between the first user device and a source device that originated the first call invite.

19. The apparatus of claim 15, wherein the instructions, when executed by the one or more processors, further configure the apparatus to:
receive, after a call associated with the first call invite, a notification that a primary computing device, with which the first user device is registered, is restarting; and
cause, based on the notification that the primary computing device is restarting, the first user device to re-register with the primary computing device.

20. The apparatus of claim 15, wherein the instructions, when executed by the one or more processors, further configure the apparatus to:
receive, after a call associated with the first call invite, a notification that a primary computing device, with which the first user device is registered, is out of service; and cause, based on the notification that the primary computing device is out of service, the first user device to register with another computing device other than the primary computing device.

21. The apparatus of claim 15, wherein the instructions, when executed by the one or more processors, further configure the apparatus to:
send, to the first user device and after a call associated with the first call invite, a network-initiated deregistration message to cause the first user device to perform a DNS look up for a new primary computing device.

\* \* \* \* \*